US012734489B2

(12) United States Patent
Souza et al.

(10) Patent No.: US 12,734,489 B2
(45) Date of Patent: Sep. 15, 2026

(54) SOLUBILIZER FOR VARIOUS MIXTURES

(71) Applicants: Bruno Pires Faria, Niterói (BR); Marcelo Bottin, São Paulo (BR); Omar Vitiello, São Paulo (BR); João Ivo Oliveira De Souza, Rio Grande (BR)

(72) Inventors: João Ivo Avelaneda De Souza, Rio Grande (BR); Omar Vitiello, São Paulo (BR)

(73) Assignees: Bruno Pires Faria, Niterói (BR); Marcelo Bottin, São Paulo (BR); Omar Vitiello, São Paulo (BR); João Ivo Oliveira De Souza, Rio Grande (BR)

( * ) Notice: Subject to any disclaimer, the term of this patent is extended or adjusted under 35 U.S.C. 154(b) by 454 days.

(21) Appl. No.: 18/572,918

(22) PCT Filed: Mar. 22, 2023

(86) PCT No.: PCT/BR2023/050098
§ 371 (c)(1),
(2) Date: Dec. 21, 2023

(87) PCT Pub. No.: WO2023/230682
PCT Pub. Date: Dec. 7, 2023

(65) Prior Publication Data

US 2024/0286091 A1 Aug. 29, 2024

(30) Foreign Application Priority Data

May 31, 2022 (BR) ........................ 102022010640-1

(51) Int. Cl.
*B01F 21/20* (2022.01)
*B01F 25/54* (2022.01)
*B01F 35/13* (2022.01)

(52) U.S. Cl.
CPC .............. *B01F 21/20* (2022.01); *B01F 25/54* (2022.01); *B01F 35/13* (2022.01)

(58) Field of Classification Search
CPC ........................... B01F 21/20; B01F 35/71731
See application file for complete search history.

(56) References Cited

U.S. PATENT DOCUMENTS 5,770,062 A 6/1998 Isbell
6,065,860 A 5/2000 Fuchsbichler
(Continued)

FOREIGN PATENT DOCUMENTS

BR PI0700134 10/2012
CN 2335961 9/1999
(Continued)

OTHER PUBLICATIONS

International Search Report dated Jun. 5, 2023 in International Application No. PCT/BR2023/050098.
(Continued)

*Primary Examiner* — Elizabeth Insler
(74) *Attorney, Agent, or Firm* — B. Aaron Schulman, Esq.; Stites & Harbison, PLLC

(57) ABSTRACT

A hydraulic recirculation device under pressure for any mixture, be it heated or not, such as those which, for any reason, have at least one solute constituent and at least one solvent, including water, and should go through a solubilization process for said solute constituent.

11 Claims, 9 Drawing Sheets

(56) References Cited

U.S. PATENT DOCUMENTS

| | | | |
|---|---|---|---|
| 6,109,778 | A | 8/2000 | Wilmer |
| 7,281,840 | B2 | 10/2007 | Simpson et al. |
| 7,592,139 | B2 | 9/2009 | West et al. |
| 8,426,135 | B1 | 4/2013 | West et al. |
| 9,127,233 | B2 | 9/2015 | Dietz |
| 9,981,228 | B2 | 5/2018 | Gaultney |
| 11,413,587 | B2 | 8/2022 | Van De Sluis et al. |
| 2009/0215023 | A1 | 8/2009 | West et al. |
| 2015/0298076 | A1* | 10/2015 | Fazekas ................ B01F 25/103 366/132 |
| 2017/0036176 | A1 | 2/2017 | Gaultney |
| 2019/0344225 | A1 | 11/2019 | Van De Sluis et al. |
| 2022/0355255 | A1 | 11/2022 | Van De Sluis et al. |

FOREIGN PATENT DOCUMENTS

| | | |
|---|---|---|
| CN | 201253136 | 6/2009 |
| CN | 204017684 | 12/2014 |
| CN | 105536588 | 5/2016 |
| CN | 207627162 | 7/2018 |
| CN | 110627232 | 12/2019 |
| DE | 3844174 | 7/1990 |
| DE | 102004026477 | 4/2009 |
| JP | S6046443 | 3/1985 |
| JP | 2003010890 | 1/2003 |
| JP | 2003260448 | 9/2003 |
| JP | 2005137968 | 6/2005 |
| JP | 2005193099 | 7/2005 |
| JP | 2006122875 | 5/2006 |
| JP | 2006130475 | 5/2006 |
| JP | 2016064367 | 4/2016 |
| JP | 2020104026 | 7/2020 |
| JP | 2020203246 | 12/2020 |
| KR | 101831758 | 2/2018 |
| RO | 130602 | 10/2015 |
| WO | WO-2009064878 | 5/2009 |

OTHER PUBLICATIONS

Written Opinion dated Jun. 5, 2023 in International Application No. PCT/BR2023/050098.

* cited by examiner

A-A Cut

B-B Cut

C-C Cut

SOLUBILIZER FOR VARIOUS MIXTURES

FIELD OF THE INVENTION

More particularly, the present Invention refers to a hydraulic recirculation device under pressure for any mixture, be it heated or not, such as those which, for any reason, have at least one solute constituent and at least one solvent, including water, and should go through a solubilization process for said solute constituent.

Therefore, the solubilizer at issue is a coadjuvant hydraulic device for the solubilization of different mixtures with various ingredients, such as: grains, grasses, roots and others, which is performed in a wide range of devices processing mixtures to obtain different products, such as e.g. in production plants for food or other products, from mixtures, including those of the "fermentable" kind, obviously for the production of different liquids: alcoholics, food, beverages, chemicals and others.

STATE OF THE ART

Currently, there is a considerable variety of devices used for solubilization in a solvent. Said devices, depending on the solubilization to be performed, may be independent or a coadjuvant in a complex facility.

Solubilization occurs in different processing situations for a wide range of constituents, i.e., in organic mixtures, metals, chemical solutions and others. Solubility is the ability of a body or matter to be dissolved or not in a given kind of liquid, including water. It is also known as solubility coefficient and defined as the ability of a given solute to be dissolved in a solvent. This process is related to chemical dissolution—the formation of a new or homogeneous mixture or solution, responsible for dispersing the solute into the solvent.

Therefore, as stated above, there is currently a wide range of devices for the solubilization of given constituents in any given solvent, as taught e.g. by the documents: BR112019011631, BRPI0700134, CN2335961, CN20125313, CN110627232, CN207627162, JP2003010890, JP2003260448, JP2005137968, JP2005193099, JP2006122875, JP2006130475, JP2016064367, JP2020104026, JP2020203246, JPS6046443, KR101831758, RO130602, U.S. Pat. Nos. 5,770,062, 7,592,139, 8,426,135, 9,127,233 and US2009215023.

Said devices are specific for each case, and thus, solubilizations obtained cover mixtures, compounds and solutions, but also involve chemically transformable situations. Consequently, each one includes its particularities.

The state of the art does not offer specific solutions as for optimizing time and increasing the solubilization ability of a mixture of constituents, by using a universal solvent, which is water, as in the production of beverages, be them alcoholic or not. In this case, a simple and efficient solubilizing device is desirable, able to optimize solid constituents (solutes) to enable them to be solubilized by means of a simple process under pressure, wherein the solid portion suffers microfragmentation, thus facilitating its chemical dissolution with the formation of a new solution or a homogeneous mixture, responsible for dispersing the solute into the solvent, which is, in this case, water.

SUMMARY OF THE INVENTION

The embodiment of a device which, in this case, is a coadjuvant for operation jointly with an already existing facility or to be built and used for processing different mixtures, wherein at least one of them is a solute. As examples, we can mention the different kinds of beer, which is a drink prepared with various adjuvant solutes, usually characterizing a mixture with barley malt, non-malt grains, water, hop and yeast. In case of beer, the solvent used is water, representing about 90% of the final product resulting from the manufacturing process.

Therefore, the water is usually heated, consisting of the solvent for the solubilization of different constituents added to the must or mixture to produce beer, such as: hop is a solute which should be solubilized and release substances which are responsible for the bitterness and flavor of the beverage, adding specific characteristics, increasing diuresis, caused by the solubilizied bitter resins of the hop; and the solubility of magnesium phosphate ($Mg_3(PO_4)_2$), which is essential for the operation of a few yeast enzymes.

Therefore, the invention embodies a hydraulic passage device, so that said mixture or must may be moved in a closed circuit, characterizing its "recirculation" inside a processing tank. Recirculation is performed by a tube interconnecting the bottom of the tank to its upper portion. A high pressure and flow pump is interleaved between said tubes, causing the flow of the mixture to be moved from the bottom of the tank to its upper portion. The flow is continued and passes through the device, wherein said passage suffers different hydrodynamic effects, especially vortexing, compression, expansion, speed reduction and shock between the particles, including solute constituents and their microfragmentation. Everything helps to increase the contact area between the solvent (water) and the solute constituent, and consequently the solubilization rate increases exponentially, reducing the processing time for the mixture, which becomes more efficient.

Other events occur when the flow passes through the device, since it also includes means to inject gases, such as: air, carbon dioxide ($CO_2$), nitrogen ($N_2$) and others, which may eventually be a part of the mixture or a constituent cooperating for solubilization.

BRIEF DESCRIPTION OF THE DRAWINGS

To better understand the present invention, its detailed description is presented below, with reference to the attached drawings.

DETAILED DESCRIPTION OF THE INVENTION

Figure 5:
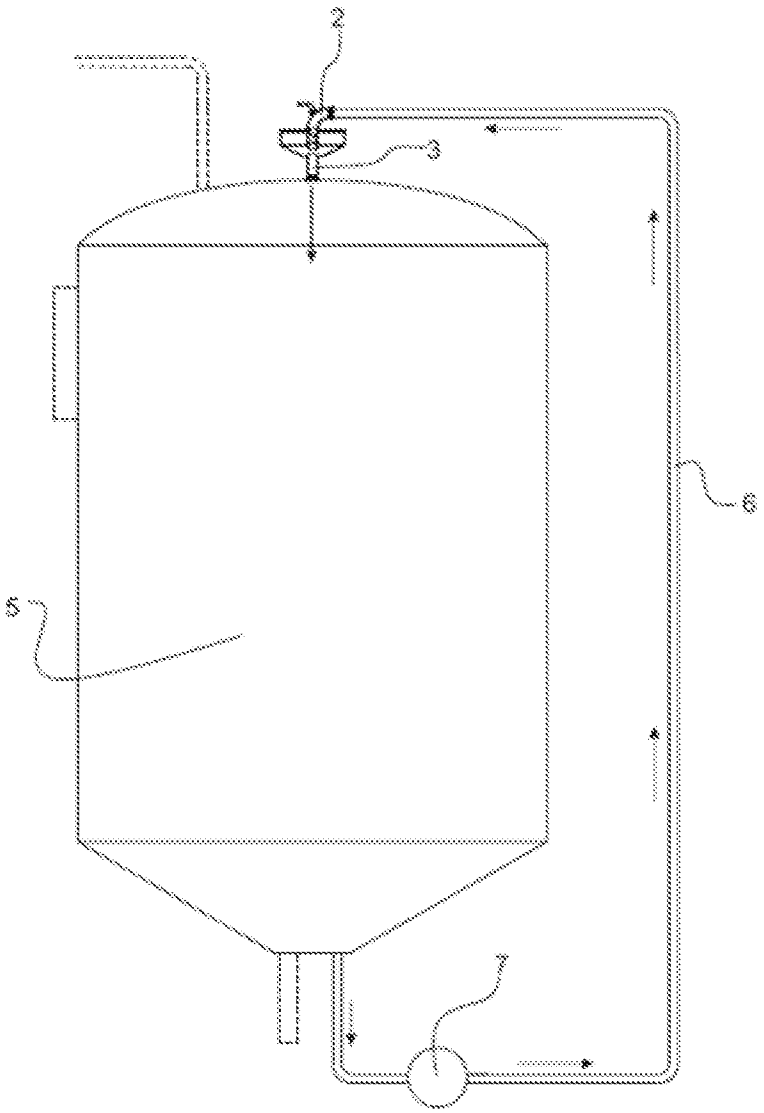
FIG. 5 shows a schematic view of the device as installed jointly with a processing tank for any given mixture.

According to those figures and their details, more specifically FIGS. 1 to 4, the present invention, a SOLUBILIZER FOR VARIOUS MIXTURES, is characterized by comprising:

a continued dynamic passage chamber (1) for the mixed flow to be solubilized;

at least one vertically assembled solubilizing core (2) going through the upper wall of the dynamic passage chamber (1), wherein a part of it or its upper end is externally exposed and configures an inlet for the flow of the mixture to be solubilized, while the other part or lower end is vertically located and hinged inside the dynamic passage chamber (1), configuring an ejection point for the flow of mixture to be solubilized into the dynamic chamber (1);

at least one vertically assembled collection tube (3) crossing the lower wall of the dynamic passage chamber (1), in a coaxial alignment position with a solubilizer core (2), wherein the internal upper end of said collector tube (3) is away from the corresponding edge of the solubilizer core (2), while its exposed lower end includes a connection (4);

the lower end with a connection (4) for the collector tube (3) (please refer to FIG. 5) is coupled to the upper part of a mixing tank (5), inside which the solubilized mixture flow is discharged;

an external recirculation pipeline (6), interconnecting the lower and the upper part of the mixture tank (5), forming a closed recirculation circuit;

a high pressure pump (7) is interleaved with the pipeline (6), wherein the mixture flow is moved from the bottom of the mixture tank (5) to the inlet of the solubilizing core (2) and from there to inside the mixture tank (5);

the upper part of the dynamic passage chamber (1) includes at least one inlet tube (8) for injecting a gas, such as carbon dioxide ($CO_2$), nitrogen ($N_2$) and others which, eventually, may be a part of the mixture or a cooperating constituent for solubilization;

a cleaning set (9) assembled to the upper part of the dynamic passage chamber (1), extending itself to its inner side;

the lower side of the dynamic passage chamber (1) includes at least one vent tube (10) for inlet and recirculation of air/gas from inside the mixture tank (5) and inside the dynamic passage chamber (1); and the lower side of the dynamic passage chamber (1) includes a central tube outlet (11) and the respective line display (12) as a transparent cup.

Figure 6:
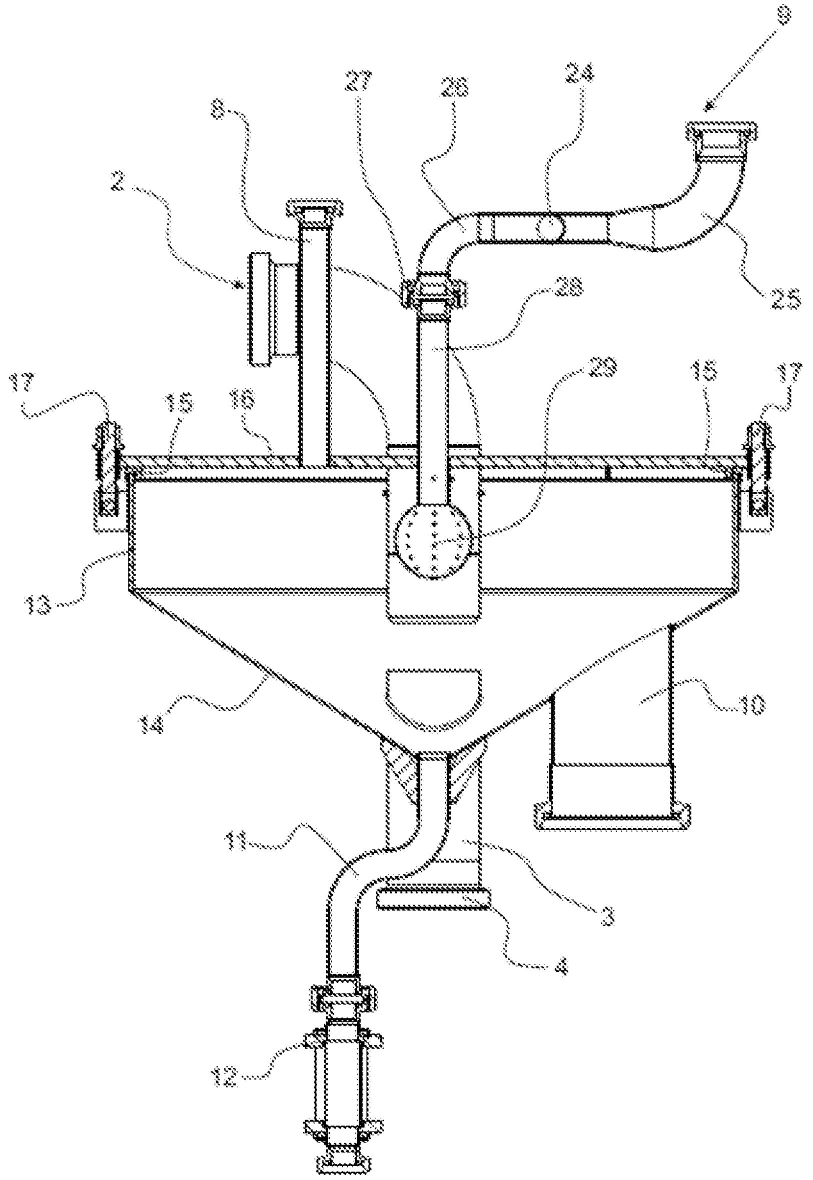
FIG. 6 shows a view of the B-B cut as shown by FIG. 3.

As also shown by FIG. 6, the dynamic passage chamber (1) is formed by a body, preferably of stainless steel, defined by a cylindrical wall (13), closed on its bottom by a conic path (14), with its acute part turned downside and connected to the central tubular outlet (11) and its respective line display (12), being located in a median position between that point and the cylindrical wall (13), the collector tube (3) and the vent tube (10) for air inlet, while the upper diameter of the cylindrical wall (13) includes trimming (15), over which a circular closing cap (16) is located, coupled to the cylindrical wall (13) by means of fasteners (17), over which cap the solubilizing core (2), the inlet tube (8) for gas injection and the cleaning set (9) are attached.

Figure 7:
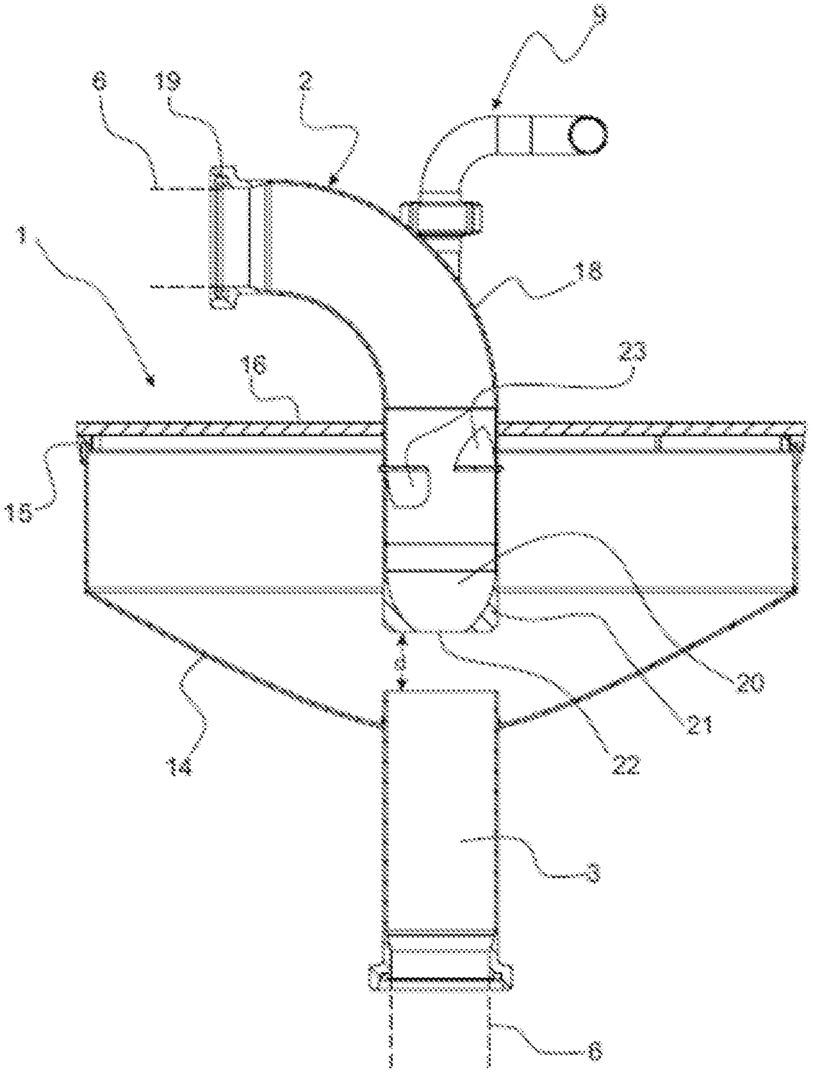
FIG. 7 is a view of the C-C cut as shown by FIG. 3.

The solubilizing core (2), seen in detail on FIG. 7, is constituted by a tube (18), preferably elbow-shaped, having its upper edge with connection coupling (19) to the pipeline (6), while its lower edge has its internal diameter with a constriction zone (20) defined by a tablet (21) which, on the other hand, ends at a lower position with reduced diameter (22) and, above it, the surface of said tablet is widened into a round shape until meeting the internal diameter of said tube (18), and also, above the constriction zone (20), at least two deflecting wings (23), both equally curved, are located and, when combined, they form a helix-shaped passage for the flow of processing mixture, causing its vortexing.

The reduced diameter (22) of the tablet (21) is between 35 and 65% shorter than the internal diameter of the collector tube (3).

The distance (d) between the lower end of the tube (18) and the upper end of the collector tube (3) is between one and six times higher than the diameter radius (22).

Figure 1:
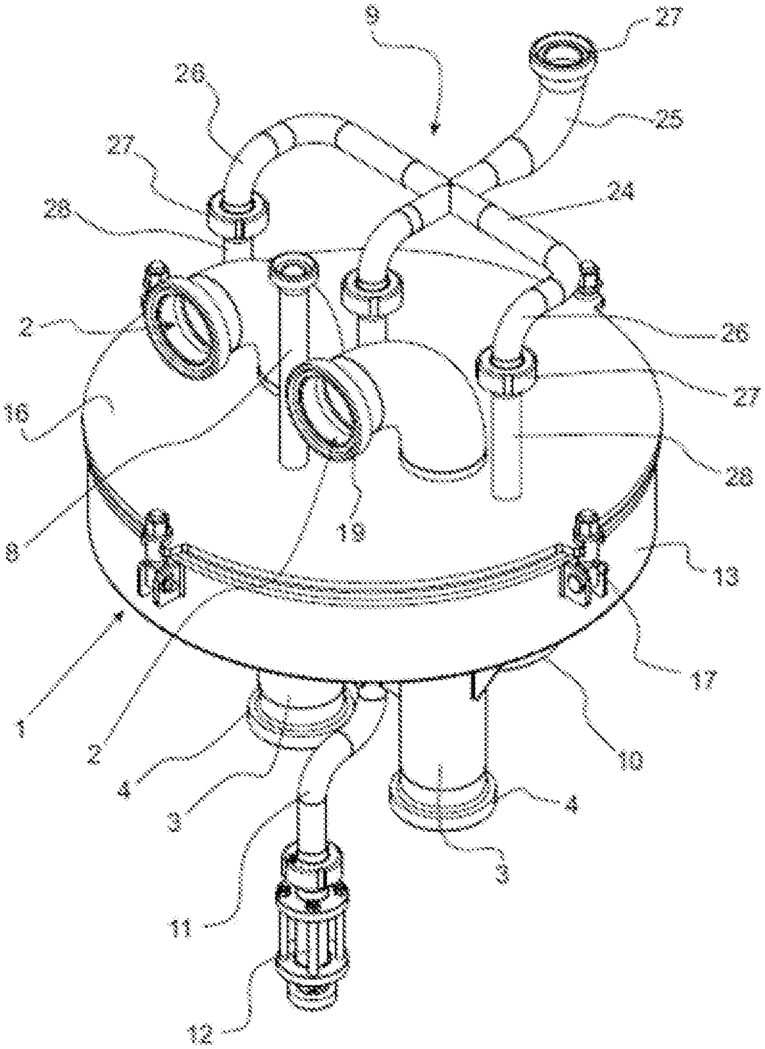
FIG. 1 shows an isometric view showing the assembled set in an upper angle.
Figure 2:
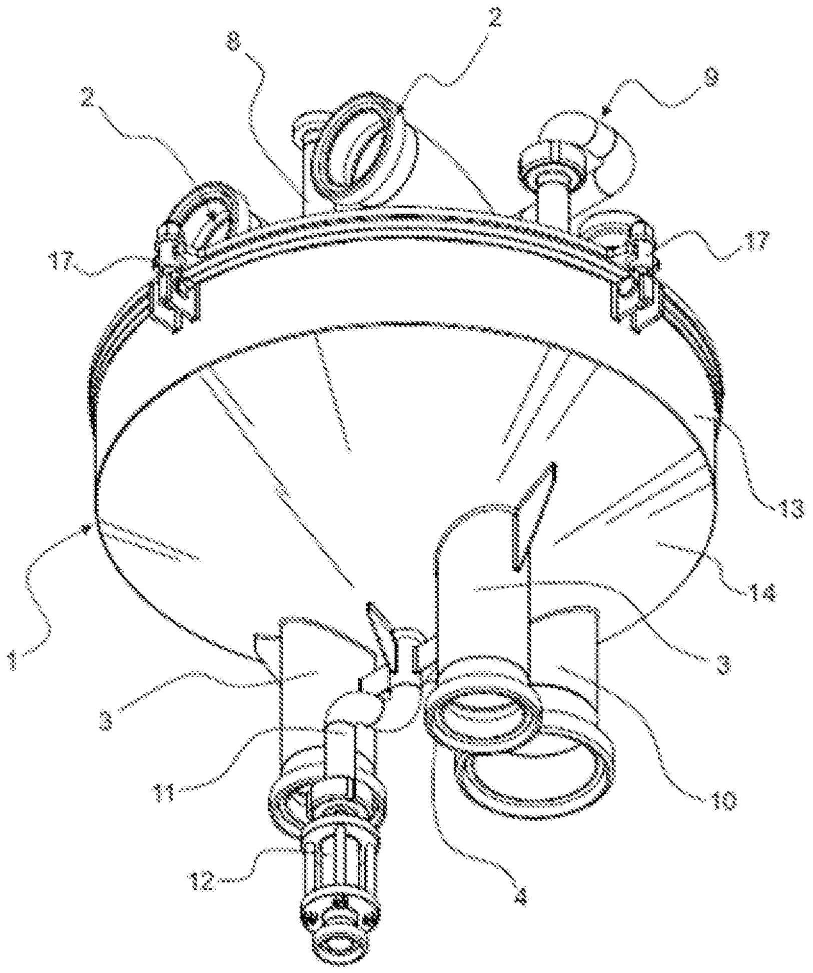
FIG. 2 shows another isometric view of the assembled set, but in a lower angle.
Figure 3:
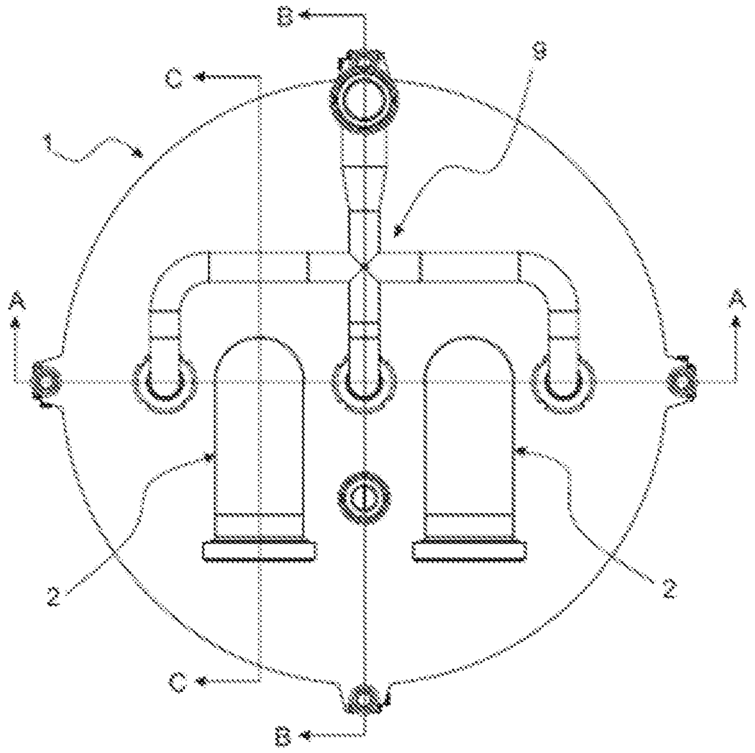
FIG. 3 shows an upper view of the device with the indications of A-A, B-B and C-C cuts.
Figure 4:
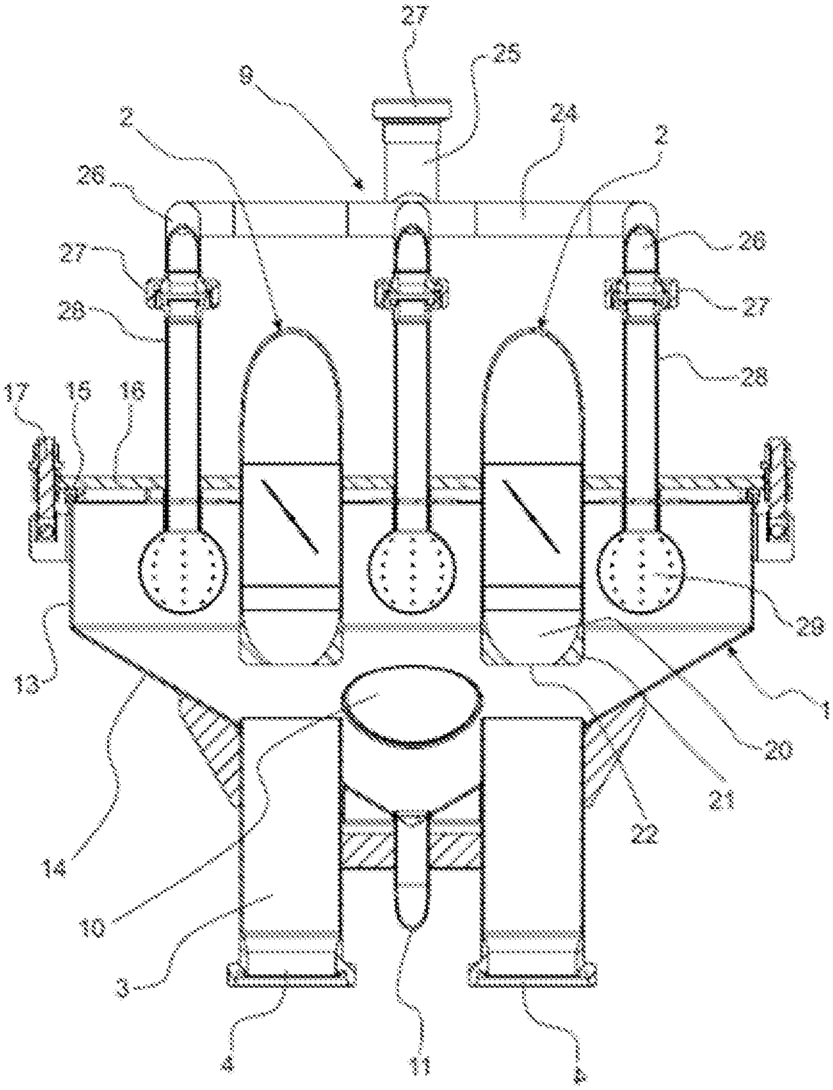
FIG. 4 shows a view of the A-A cut as shown by FIG. 3.

Referring to FIG. 4, the cleaning set (9) is constituted by a manifold (24), with one inlet (25) and outlets (26), having connection couplings (27) to a pipeline to supply cleaning water and connection to the tubes (28), the latter transpassing and being vertically coupled to the circular cap (16) and, inside the dynamic passage chamber (1), its outlets have the form of spheroid sieves (29), which orifices provide means to form water jets, heated or not, to all directions and against the internal walls of the dynamic passage chamber (1), allowing them to be washed by not disassembling the set.

Figure 8:
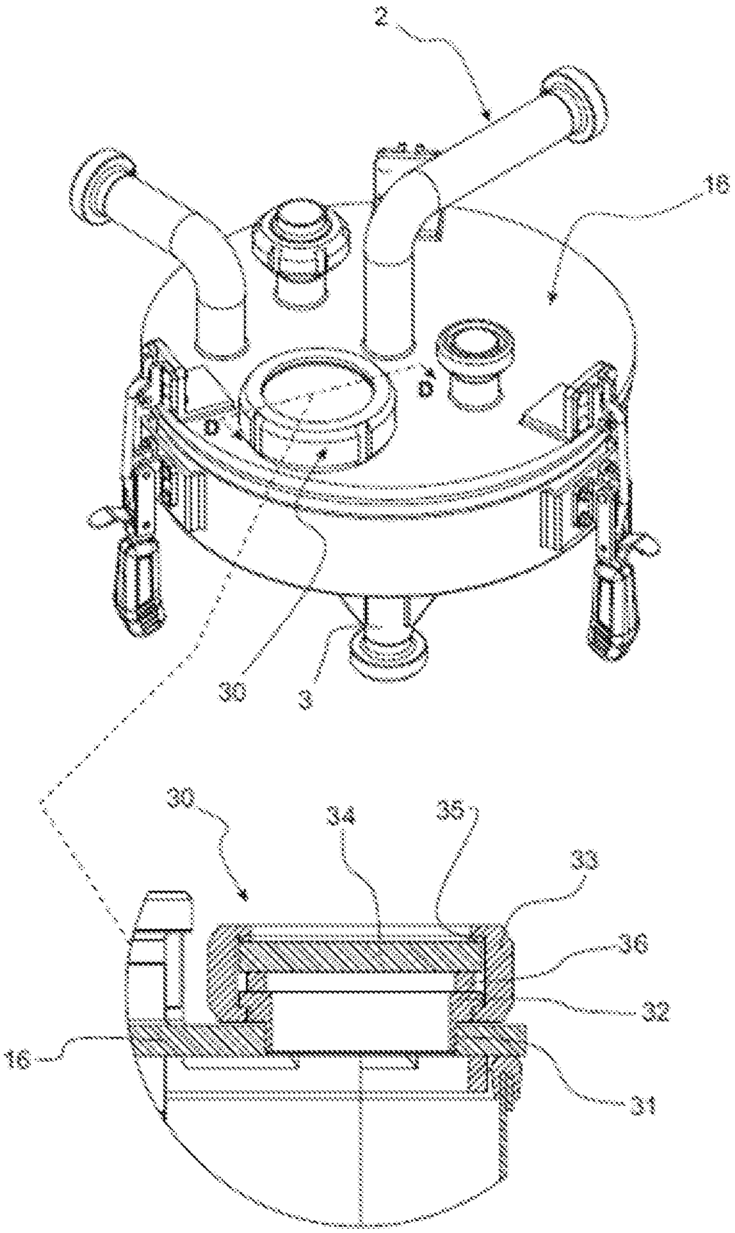
FIG. 8 shows a perspective view in upper angle and a magnified cut detail; highlighting a version in smaller dimensions than the ones as shown by the previous figures.
Figure 9:
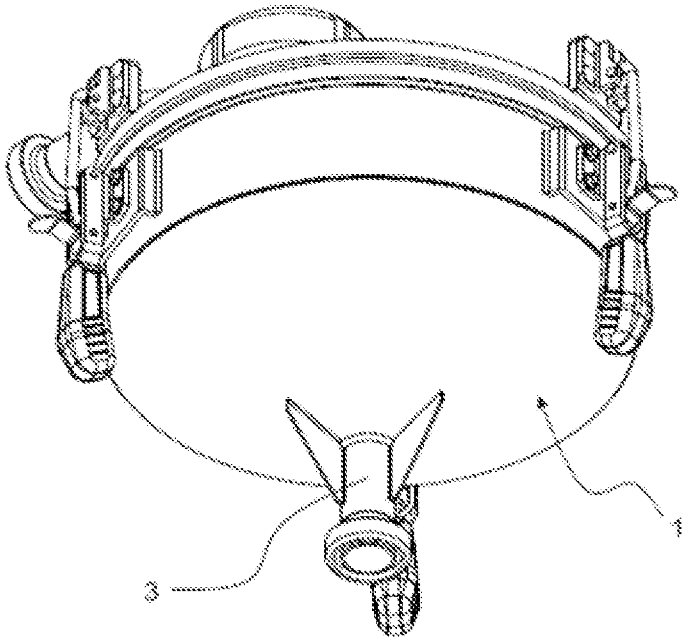
FIG. 9 is a perspective view showing the lower version in a lower angle.

The present solubilizer was developed for manufacturing under different dimensions, depending on the desired productivity/hour. Therefore, FIGS. 1 to 7 show a version with two solubilizing cores (2), which does not appear on FIGS. 8 and 9, showing a version with just one solubilizing core (2). In this case, it is assembled in exactly the same way, i.e. by vertically crossing the circular closing cap (16) of the dynamic passage chamber (1), but exactly on its central part. Consequently, its collecting tube (3) is equally aligned to the center of the conic path (14) of the dynamic passage chamber (1), and that centralized tubular outlet (11) and the respective line display (12) were thus eliminated, being this latter set substituted with a display window (30), installed in a hole (31) made on the circular closing cap (16), wherein the set is formed by a nipple (32), having its base attached to the circular closing cap (16), while its upper end is coupled to a screw (33) with an internal flange enclosing a glass disc (34) between two seals (35) and (36). Said glass disc (34) allows for the internal visualization of the dynamic passage chamber (1) to verify its internal activity.

The embodiment with only one solubilizing core (2) optionally eliminates the cleaning set (9), and may even include a modified cleaning set with smaller dimensions, keeping other necessary details, especially an air or gas inlet.

As we can see, the present device was developed to establish a continued flow in closed circuit, established jointly with the mixing tank (5), which, on the other hand, is loaded with a batch of ingredients to be mixed and solubilized, under heating or not. The established flow enters at least one solubilizer (2) under high pressure and, at that point, suffers a first dynamic effect when passing through the deflecting wings (23), wherein the flow suffers high rotation (vortexing). At that point, a first effect occurs between the flow friction against the tube wall (18) of the solubilizing core (2), i.e. the constituents are homogenized, thus drastically reducing their surfactant effect, allowing the flow to slide with no interference inside the tube (18). Subsequently, the vortexing flows through the constriction zone (20) and the reduced diameter (22). At that point, different effects concur. The first effect is a considerable increase in pressure at the constriction zone (20) itself and, after the diameter (22), the speed of the flow being injected into the collector tube (3) increases and, shortly after its inlet, the flowing speed and pressure are reduced and the flow is expanded, obviously limited by the larger diameter of said collecting tube (3), wherein the expanded volume works as an impact point for the flow exiting at high speed from the diameter (22) of the constriction zone (20) and the internal region of the collecting tube (3) and, consequently, the particles of the mixture constituents abut themselves, causing their microfragmentation by shearing. At that point, another effect concurs, which is the aspiration and mixture of gases which is injected through the tube (8) or aspiration of the air entering through the vent tube (10). In this case, optionally, gas and air injection may occur simultaneously, or the injection of just one of them.

The solubilization of one or more constituents occurs in higher degree when the flow goes in and out the solubilizer (2), since, during that flow, different effects occur, especially microfragmentation, considerably increasing the contact surface between the solute and the solvent, e.g. water, also making the mixture become more homogeneous, and consequently eliminating the surfactant effect between the particles, everything exponentially speeding up the solubilization process of the solute constituents in the mixture.

Concerning the operation of the cleaning set (9), we can notice that it has an embodiment enabling the water flow, be it heated or not, to be injected under pressure into the dynamic passage chamber (1), wherein the spheroid sieves (29) produce various jets against their walls, fully removing any sediments which, jointly with the water, are removed by gravitation and flow towards the tank (5) through the central tubular outlet (11) and its respective line display (12) as a transparent cup. Said line display allows to detect not only the internal cleaning stage of the set, but also other irregularities which may eventually occur when the material flows through the solubilizing core (2), i.e. if there is an eventual imbalance in the speed or pressure rank in the recirculation line, the processed material consequently escapes from the collecting tube (3) and flows by gravitation through the line display (12), showing irregular operation of the device.

The invention claimed is:

1. A hydraulic recirculation device under pressure for a mixture, be it heated or not, the mixture having at least one solute constituent and at least one solvent, the solute constituent being solubilized by the hydraulic recirculation device; comprising:

a continued dynamic passage chamber for the mixture to be solubilized, wherein an upper end of the continued dynamic passage chamber is externally exposed and configures an inlet for the mixture to be solubilized, the upper end of the continued dynamic passage chamber includes at least one inlet tube for injecting at least one cooperating constituent to the mixture, and wherein a lower end of the continued dynamic passage chamber is vertically located and hinged inside the continued dynamic passage chamber, configuring an ejection point for the mixture to be solubilized in the continued dynamic passage chamber, the lower end further including a central tube outlet and a respective line display that together is in the form of a transparent cup, as well as at least one vent tube for inlet and recirculation of air or gas from inside the continued dynamic passage chamber;

at least one vertically assembled solubilizing core going through an upper wall of the continued dynamic passage chamber;

at least one vertically assembled collection tube crossing a lower wall of the continued dynamic passage chamber, wherein the at least one vertically assembled collection tube is in a coaxial alignment position with the at least one vertically assembled solubilizing core, wherein an internal upper edge of the at least one vertically assembled collection tube is away from a corresponding internal upper edge of the at least one vertically assembled solubilizing core, and wherein an exposed lower end of the at least one vertically assembled collection tube includes a connection;

a mixture tank into which the mixture is discharged having an upper part, wherein the upper part of the mixture tank is coupled to the at least one vertically assembled collection tube by the connection of the exposed lower end, wherein the mixture tank is also connected to the at least one vent tube for inlet and recirculation of air or gas from inside the mixture tank;

an external recirculation pipeline interconnecting a lower part and the upper part of the mixture tank to form a closed recirculation circuit;

a high pressure pump that is interleaved with the external recirculation pipeline, wherein the mixture is moved from the bottom of the mixture tank to the inlet of the at least one vertically assembled solubilizing core; and a cleaning set assembled to the upper end of the continued dynamic passage chamber.

2. The hydraulic recirculation device of claim 1, wherein the dynamic passage chamber is formed by a body defined by a cylindrical wall, wherein the body is closed on its bottom by a conic path, the vertex end of the conic path being connected to the central tubular outlet and the respective line display, the at least one vertically assembled collecting tube, and the at least one vent tube for air inlet, and wherein upper diameter of the cylindrical wall includes trimming over which a circular closing cap is coupled to the cylindrical wall by means of fasteners, the circular closing cap being connected to the at least one vertically assembled solubilizing core, the at least one inlet tube and the cleaning set.

3. The hydraulic recirculation device of claim 1, wherein the at least one vertically assembled solubilizing core further comprises an elbow-shaped tube, wherein an upper end of the elbow-shaped tube is coupled for connection to the external recirculation pipeline, wherein a lower end of the elbow-shaped tube has an internal diameter with a constriction zone defined by a tablet, wherein lower side of the tablet ends at a reduced diameter, and surface of upper side of the tablet is widened in a rounded shape until meeting the internal diameter of the elbow-shaped tube, wherein at least two deflecting wings are located above the constriction zone, the at least two deflecting wings are equally curved and in combination, form a helix vortexing passage for the mixture.

4. The hydraulic recirculation device of claim 3, wherein the reduced diameter of the tablet is between 35 and 65% shorter than internal diameter of the at least one vertically assembled collection tube.

5. The hydraulic recirculation device of claim 1, wherein distance between the lower end of the elbow-shaped tube and an upper end of the at least one vertically assembled collection tube is one to six times longer than the reduced diameter of the tablet.

6. The hydraulic recirculation device of claim 2, wherein the cleaning set is formed by a manifold with one manifold inlet and at least one manifold outlet, the at least one manifold outlet having couplings for connection to the one manifold inlet to supply cleaning water and to connect to cleaning tubes, wherein the cleaning tubes crosses and are vertically coupled to the circular closing cap, and ends of the cleaning tubes inside the continued dynamic passage chamber are in the form of spheroid sieves.

7. The hydraulic recirculation device of claim 2, wherein the hydraulic recirculation device comprises only one vertically assembled solubilizing core and only one vertically assembled collection tube, wherein the only one vertically assembled solubilizing core is assembled in a central position and vertically crossing the circular closing cap of the dynamic passage chamber, wherein the only one vertically assembled collection tube is aligned with center of the conic path of the dynamic passage chamber.

8. The hydraulic recirculation device of claim 7, further comprising a display window assembly installed in a hole made on the circular closing cap, wherein base of the display window assembly is attached to the circular closing cap through a nipple, and wherein on upper end of the display window assembly, a screw is coupled with an internal flange fixing a glass disc between two seals.

9. The hydraulic recirculation device of claim 8, wherein the cleaning set has shorter dimensions.

10. The hydraulic recirculation device of claim 1, wherein the at least one solvent is water.

11. The hydraulic recirculation device of claim 1, wherein the at least one cooperating constituent is at least one of the following: carbon dioxide ($CO_2$) and nitrogen ($N_2$).

* * * * *